United States Patent [19]
McDaniel

[11] 3,882,374
[45] May 6, 1975

[54] TRANSMITTING-RECEIVING COIL CONFIGURATION

[75] Inventor: Alden W. McDaniel, Washington, D.C.

[73] Assignee: The United States of America as represented by the Secretary of the Army, Washington, D.C.

[22] Filed: Apr. 18, 1974

[21] Appl. No.: 462,159

[52] U.S. Cl. .......................... 324/3; 324/6; 324/41
[51] Int. Cl. .............................................. G01v 3/10
[58] Field of Search .......................... 324/3, 4, 6, 41

[56] References Cited
UNITED STATES PATENTS
| | | | |
|---|---|---|---|
| 1,126,027 | 1/1915 | Jullig | 324/3 X |
| 2,220,070 | 11/1940 | Aiken | 324/6 |
| 2,451,596 | 10/1948 | Wheeler | 324/3 |

FOREIGN PATENTS OR APPLICATIONS
| | | | |
|---|---|---|---|
| 960,966 | 4/1950 | France | 324/6 |

*Primary Examiner*—Gerard R. Strecker
*Attorney, Agent, or Firm*—Nathan Edelberg; Robert P. Gibson; Saul Elbaum

[57] ABSTRACT

A transmitting-receiving coil configuration for a metal detector. A transmitting coil is located in the same plane as two receiving coils one of which is of greater diameter than the receiving coil and the other of which is of smaller diameter. The receiving coil of smaller diameter is elliptically shaped to provide a gradual null in the direction of the major axis of the ellipse. The receiving coils are connected in series opposition and initial balance is obtained by varying the diameter of the transmitting coil and final balance is obtained by varying the number of turns on the inside receiving coil. When in the vicinity of a metal object a current 90° out of phase with the alternating current fed to the transmitting coil is induced in the receiving coils. When the center of the coils is moved directly over the metal object a null is obtained. The areas bounded by the coils are adjusted to compensate for the background effect.

1 Claim, 2 Drawing Figures

TRANSMITTING-RECEIVING COIL CONFIGURATION

RIGHTS OF THE GOVERNMENT

The invention described herein may be manufactured, used, and licensed by or for the United States Government for governmental purposes without the payment to me of any royalty thereon.

BACKGROUND OF THE INVENTION

The invention relates to an improved transmitter-receiver coil configuration for a metal detector and to a method of balancing the coil configuration.

The transmitter-receiver coil configuration of the invention is used with prior art metal detectors of the type in which A.C. current is applied to the transmitting coil resulting in the generation of a primary alternating electromagnetic field. If there is any metal in the vicinity, this field will induce eddy currents in the metal thus causing the metal to radiate a secondary electromagnetic field having a component which is 90° out of phase with the primary transmitted field. The secondary electromagnetic field induces in the receiving coils a signal which is 90° out of phase with the current in the transmitting coil thus indicating the presence of metal. The current in the receiving coils is phase detected using the transmitter coil current phase as a reference to determine when the two currents are in phase quadrature and hence when metal is being detected. Such phase-selective metal detecting systems are more fully described in U.S. Pat. No. 3,609,522 and U.S. Pat. No. 3,617,866 and these patents are incorporated herein by reference.

In order to separate the signals induced in the receiving coils by the primary field and the secondary field, two or more receiving coils may be connected to each other in opposing manner so that the signals induced by the primary field in the different receiving coils cancel each other out while the signals induced by the secondary field do not. The coils are thus in a balanced condition until brought into the proximity of metal.

In one arrangement of the prior art, four co-planar receiving coils arranged in a square are provided, with the transmitting coil being located above the plane of the receiving coils with its center above the middle of the square. The balance between the transmitting and receiving coils, that is the cancellation of the signals in the receiving coils when no metal is present referred to above, is secured by the use of a bucking transformer. The arrangement of the prior art thus uses five coils located in two different planes plus a bucking transformer to provide a metal detecting function.

SUMMARY OF THE INVENTION

Accordingly, it is an object of the invention to provide a simpler, less expensive and more sensitive metal detector arrangement.

Briefly, the invention comprises a transmitting-receiving coil of new geometrical configuration and a method for balancing it. The transmitting coil is disposed in the same plane as two receiving coils one of which is of greater diameter than the transmitting coil and the other one of which is of smaller diameter. Initial balance is obtained by adjusting the diameter of the transmitting coil and final balance is secured without the need of a bucking transformer by varying the turns of the inner receiving coil. To minimize the upset of the induction balanced arrangement from the effects of varying backgrounds, it is preferred according to the present invention to equalize the flux linkage of the transmitting coil and the receiving coils. When metal is close by a signal 90° out of phase with the signal in the transmitter coil is detected in the receiver coils. To precisely locate the position of the metal the coil configuration is moved until the metal is beneath the center of the configuration whereupon the signals in the receiving coils cancel out and a null is obtained. By giving the inner coil a non-circular shape, especially an elliptical shape, the sensitivity of the arrangement is increased by providing for a more gradual null indication in the direction of the major axis of the ellipse.

DESCRIPTION OF THE DRAWINGS AND THE PREFERRED EMBODIMENT

The invention will be better understood by reference to the drawings in which.

Referring to the arrangement of the prior art shown in FIG. 1 the four coplanar receiving coils 1 form a square the middle of which is directly above the center of transmitting coil 2 which is located in a plane below the plane of the receiving coils. Balance between the transmitting and receiving coils is secured in known fashion by the use of a resistance bridge circuit in combination with a bucking transformer both not shown. The coils are housed at 10, such as by potting, and the coils 1 are connected so that when the metal object is directly beneath the center point 3 the currents in the coils induced by the metal object cancel out and a null is obtained.

Figure 2:
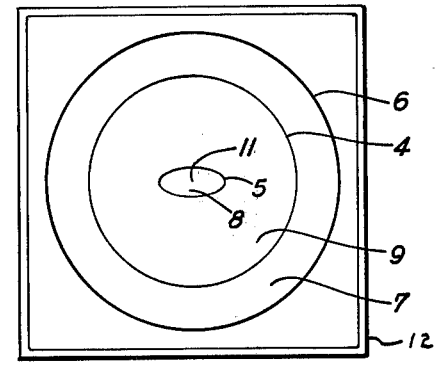
FIG. 2 is a schematic illustration of the transmitting-receiving coil configuration of the invention.

FIG. 2 shows a transmitting-receiving coil configuration in accordance with the present invention. Transmitting coil 4 is located in the same plane as receiving coils 5 and 6 with the diameter of the transmitting coil being intermediate that of the two receiving coils. The receiving coils are connected in series opposition and the inner receiving coil is elliptically shaped. The coils are potted together (shown as housing 12) for structural rigidity. In the operation of the device alternating current is supplied to the transmitting coil 4 resulting in the generation of an alternating electromagnetic field. The receiving coils 5 and 6 are arranged to be in a balanced condition so that the currents directly induced therein from the primary field generated by the transmitting coil cancel out due to the opposed connection of the receiving coils. When metal is in the path of the primary field eddy currents are generated in the metal which in turn generate a secondary field which induces a current in the receiving coils which is 90° out of phase with the current in the transmitting coil. This current is unequal in the two coils and so does not cancel out and it is detected by a phase discriminator. The coil configuration is moved until its center 11 is directly over the metal object at which time the currents in receiving coils 5 and 6 cancel each other out and a null is obtained which is transmitted to the operator as a signal indicating that he is directly over the metal object. The inner coil 5 is elliptically shaped so as to provide greater sensitivity and a more gradual null in the direction of the major axis of the ellipse.

The balance referred to above between the transmitting and receiving coils to result in the cancellation of the currents induced by the primary field in the receiving coils is effected without the use of a bucking transformer by first adjusting the diameter of transmitting coil 4 which provides a rough balance and then by varying the number of turns on elliptical coil 5 which provides a final balance.

When the detector is moved from a region having one background to a region having a different background the coil configuration may become unbalanced. Referring to FIG. 2 it has been found that if the sum of the areas 7 and 8 is made approximately equal to the area 9 that the unbalance due to the background effect is minimized or eliminated.

Figure 1:
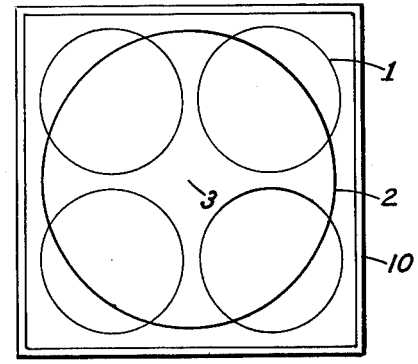
FIG. 1 is a schematic illustration of a transmitting-receiving coil configuration of the prior art.

Thus the coil configuration of the present invention in comparison with the prior art arrangement shown in FIG. 1 is more compact because all of the coils are in one plane, uses three coils instead of five and for equal outside diameters has greater sensitivity because of the increased area of the receiving coils. Additionally the configuration of the invention provides an elliptical coil for gradual nulling, allows balancing without the need of a bucking transformer and provides compensation for the effects of changing backgrounds.

I wish it to be understood that I do not desire to be limited to the exact details of construction shown and described, for obvious modifications can be made by a person skilled in the art.

I claim:

1. In a metal detector of the type in which a transmitting coil is excited with alternating current of a given phase to generate electromagnetic waves and those of said waves which are reflected off metal induce a current in at least a receiving coil of said detector, which current has a component which is in phase quadrature with said given phase, the improvements comprising, said transmitting coil being of a first diameter, a first receiving coil being concentric and co-planar with said transmitting coil and being of a greater diameter than said transmitting coil, a second receiving coil being co-planar with said first receiving coil and being connected in series opposition therewith, said second receiving coil being of a smaller diameter than said transmitting coil and having a cross section of elliptical shape, each of said coils bounding an area, the difference between the area bounded by said first receiving coil and that bounded by said transmitting coil added to the area bounded by said second receiving coil being equal to the difference between the area bounded by said transmitting coil and that bounded by said second receiving coil, initial balance between said transmitting and receiving coils having been effected by adjusting the diameter of said transmitting coil and final balance having been effected by varying the number of turns on said second receiving coil.

* * * * *